(12) United States Patent
Gudmundsson et al.

(10) Patent No.: US 7,395,072 B2
(45) Date of Patent: Jul. 1, 2008

(54) SYSTEM AND A METHOD FOR PROVIDING A COMMUNICATION LINK

(75) Inventors: Stefan Gudmundsson, Göteborg (SE); Anders Ljunggren, Kållered (SE); Michael Sena, Åsa (SE)

(73) Assignee: Volvo Technology Corporation, Goteborg (SE)

( * ) Notice: Subject to any disclaimer, the term of this patent is extended or adjusted under 35 U.S.C. 154(b) by 0 days.

(21) Appl. No.: 10/707,551

(22) Filed: Dec. 20, 2003

(65) Prior Publication Data

US 2004/0192348 A1    Sep. 30, 2004

Related U.S. Application Data

(63) Continuation of application No. PCT/SE01/01495, filed on Jun. 28, 2001.

(51) Int. Cl.
*H04B 7/185*    (2006.01)
(52) U.S. Cl. ................. 455/456.1; 455/445; 455/414.1; 455/12.1; 455/404.2
(58) Field of Classification Search ............ 342/357.07; 455/456.1, 414.1, 12.1, 321, 403, 445, 404.2; 340/286.01, 426.19, 989; 370/352; 201/29
See application file for complete search history.

(56) References Cited

U.S. PATENT DOCUMENTS

| 5,223,844 A | | 6/1993 | Mansell et al. ............... 342/357 |
| 5,533,019 A | * | 7/1996 | Jayapalan .................... 370/352 |
| 5,572,204 A | | 11/1996 | Timm et al. .................. 340/988 |
| 5,673,305 A | * | 9/1997 | Ross ........................... 455/517 |
| 5,686,910 A | | 11/1997 | Timm et al. .................. 340/988 |
| 5,687,215 A | | 11/1997 | Timm et al. .................... 379/58 |
| 5,781,101 A | | 7/1998 | Stephen et al. ......... 340/286.02 |
| 5,890,061 A | | 3/1999 | Timm et al. ............... 455/404.2 |
| 5,933,080 A | * | 8/1999 | Nojima .................... 340/426.19 |
| 6,256,489 B1 | * | 7/2001 | Lichter et al. ............ 455/404.2 |
| 6,285,931 B1 | * | 9/2001 | Hattori et al. .................. 701/29 |
| 6,819,929 B2 | * | 11/2004 | Antonucci et al. .......... 455/445 |

FOREIGN PATENT DOCUMENTS

| WO | WO 9810602 A1 | 3/1998 |
| WO | WO 9859256 A2 | 12/1998 |
| WO | WO 0137589 A1 | 5/2001 |

\* cited by examiner

*Primary Examiner*—David Q. Nguyen
(74) *Attorney, Agent, or Firm*—Novak Druce + Quigg LLP

(57) ABSTRACT

System and method for providing a communication link between a central station (11) and a remote mobile or stationary object (13) including transmitting and receiving communication means (13) having transmitting and receiving communication means (14, 15) for speech and data transmission. The communication link includes a speech transmission link between the central station (11) and the remote object (13). The communication link also includes a data transmission link between the remote object and the central station that is rerouted via a centralized communication and database server (10) for handling operator and/or object related information. The method includes establishing a speech connection between the central station (11) and the remote object (13), and simultaneously establishing data connections between the remote object (13) and the communication and database server (10) as well as between the central station and the communication and database server.

35 Claims, 2 Drawing Sheets

SYSTEM AND A METHOD FOR PROVIDING A COMMUNICATION LINK

CROSS REFERENCE TO RELATED APPLICATIONS

The present application is a continuation patent application of International Application No. PCT/SE01/01495 filed 28 Jun. 2001 which was published in English pursuant to Article 21(2) of the Patent Cooperation Treaty.

Said application is expressly incorporated herein by reference in its entirety.

BACKGROUND OF INVENTION

1. Technical Field

The present invention relates to the field of wireless communication, and more precisely, to a system and a method for providing a communication link between a central station and a remote mobile or stationary object utilizing transmitting and receiving communication means for speech and data transmission. The invention also relates to a method for utilizing such a system.

2. Background

U.S. Pat. No. 5,890,061 discloses an emergency message system for a mobile vehicle for communication with a response center. A cellular transceiver has a restricted and an unrestricted operation mode. The restricted operating mode is selectable by a user to establish communication links that are permitted during normal operation, whereas the unrestricted operation mode is activated prior to initiating a request for assistance in case of emergency, thereby allowing a more reliable connection over a cellular telephone network.

Further, emergency message systems for mobile vehicles are also disclosed in U.S. Pat. No. 5,781,101, U.S. Pat. No. 5,687,215, U.S. Pat. No. 5,686,910 and U.S. Pat. No. 5,572,204. A user can request emergency or roadside assistance from a response service center by activating a button in the vehicle. The global positioning system is used to continuously store the vehicle's location. A cellular telephone network is used to contact the service center and to transfer, via modem, a data string containing information to assist the service center in acting on the request. The various systems comprise (include, but are not limited to) additional means either for storing system information, for sending a termination tone to the vehicle upon satisfactory completion of the request, for initiating an automatic call-in to the service center if a predetermined time has elapsed since the last connection and for initiating a second call to a different number if a first attempt to contact the response center has been unsuccessful.

These prior art systems are not very well suited to environments and situations where a vehicle travels across a border from one country to another. Usually, this involves the transfer of responsibility from one service center operator to another. A large amount of functionality is needed for-this transfer to function smoothly, without risk of interrupting service.

For example, a customer database will have to be maintained and updated at every customer service station. It is also a problem for a large number of customer service station operators to allocate resources for upgrading and scaling-up the telematic infra-structure in response to a growing number of service clients. Additionally, it will be difficult to add or remove services to this environment where different service operators may have different types of system platforms with completely different interfaces to service clients.

It would be desirable for a service client to have access to the same level of service via a transparent interface when traveling across a continent, for example Europe.

SUMMARY OF INVENTION

What is needed, therefore are system(s) and a method(s) for providing a communication link between a central station and a remote mobile or stationary object that avoids the above-described disadvantages. According to the present invention, this is achieved by providing the communication link with both a speech transmission link between the central station and the operator of the remote object, as well as a data transmission link between the remote object and the central station which is routed via a centralized communication and database server for handling operator and/or object related information. This system and method is especially suitable and provided for exchange of information, data and even software programs, as well as for voice communication between cars, trucks, boats and/or other vehicles on one hand, and at least one central station on the other hand. This central station may, for example, be a center or service station of a manufacturer, a head station for guiding or operating the vehicles, or for providing assistance in case of emergency or accident. Further, the system and method is suitable for providing communication with facilities and plants in remote areas that are operated, controlled, observed or monitored from one or more of those central stations.

According to an advantageous embodiment of the invention, the communication and database server comprises a communication server with functionality for handling operator and object identification, an operator and object information database as well an application server with functionality for making relevant information available to the central station.

According to another embodiment of the invention, the application server is provided with functionality for updating operator and object information.

Preferably, the communication links are established via a cellular communication network or a satellite communication network.

In one particular embodiment of the invention, the central station is a customer service center and the remote object is a vehicle, a boat, a plane or stationary remote facility or plant. In the instances where the remote object is moveable such as some type of vehicle, a Global Positioning System (GPS) will normally be utilized to provide position (location) information.

The method according to the invention is characterized by steps that establish a speech connection between the central station and the remote object, while simultaneously establishing a data connection between the remote object and a communication and database server, as well as between the central station and the communication and database server.

A preferred embodiment of the inventive method includes steps of locating the position of the remote object, controlling the functional and operational status of the remote object and its operator, and adapting the response to the type of service requested.

According to still another embodiment of the method, steps of providing the communication and database server with the functionality for adding, removing and updating services are included.

BRIEF DESCRIPTION OF DRAWINGS

The invention will be further described in the following, in a non-limiting way with reference to the accompanying drawings, in which.

DETAILED DESCRIPTION

Figure 1:
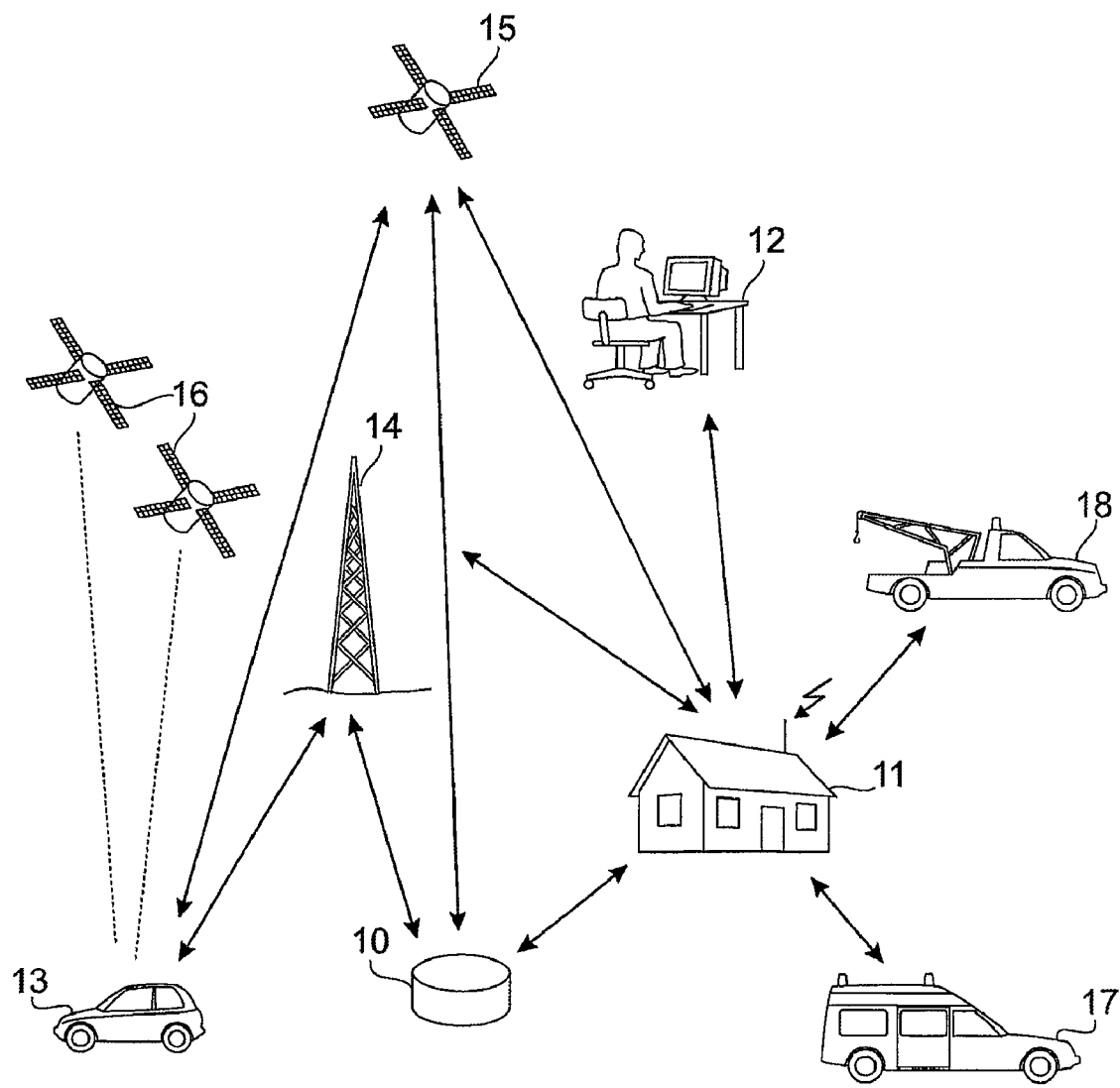
FIG. 1 is a schematic view showing elements of a system configured according to the invention, including remote objects, a public switched telephone network, a customer service center and a telematics enterprise manager.

FIG. 1 shows the major components of a preferred embodiment of the inventive system and its environment. It comprises a customer service center server (CSCS) 10 and a customer service center (CSC) 11 with an operator 12. At least one vehicle 13, vessel or plane, as well as one or more stationary objects like a remote facility or plant are able to communicate with the CSCS 10 and the CSC 11 via a cellular communication network 14 like GSM (European standard) or AMPS (US standard) and/or a satellite communication network 15, both for voice communication, and for exchange of information data, each in both directions. Further, even software programs may be transmitted if necessary. The vehicle position may be detected by means of the global positioning system (GPS) 16.

An emergency assistance vehicle 17 and a roadside assistance vehicle 18 communicate with the CSC 11 in a similar manner or in any other way and are activated by the CSC in response to an assistance request from the vehicle 13.

In general, the system provides telephone services and emergency and technical assistance using both cellular and satellite communication. This allows for a reliable connection both between the vehicle and the CSCS and the vehicle and the CSC, as well as between the CSCS and the CSC. For example, the speech link between the vehicle and the CSC may be used as a backup for transmission of data via DTMF, e.g. in case of an interrupt of the data transmission link between the vehicle and the CSCS.

The above-described system can automatically handle emergency situations, remote diagnostics, and maintenance and command to the vehicle 13. Further, a vehicle driver or operator of a remote facility can manually request assistance or trigger an emergency signal to the CSC and the CSCS; and additionally, the vehicle or remote facility can automatically inform the CSC and the CSCS in case of emergency, malfunction or for other reasons. All these exchanges of data, voice and information (and even software) is conducted with high reliability due to the use of both cellular and satellite communication. The actual position of the vehicle is evaluated by means of the global positioning system.

Figure 2:
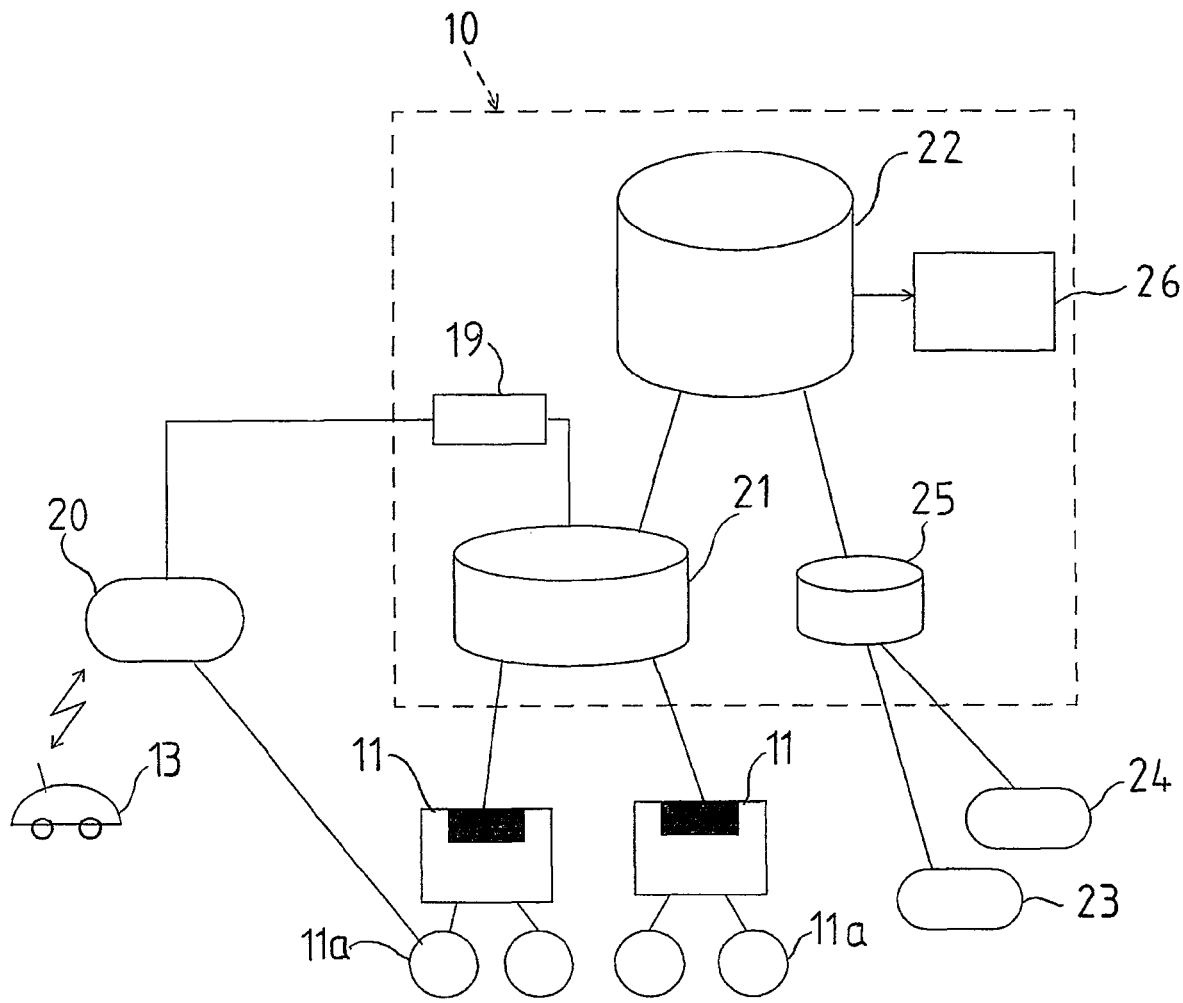
FIG. 2 illustrates in more detail the relationship of the telematics enterprise manager and different customer service centers.

The relationship between the customer service station server (CSCS) 10 and a number of individual customer service centers (CSC) 11 is shown in FIG. 2. The CSCS is provided with a communication server 19 for handling data communication via cellular or satellite communication networks 20, from a service system client vehicle 13 or a remote facility. A service request message from the vehicle 13 or the remote facility is transferred to a functionality application server 21 who activates relevant service functionality corresponding to a customer service subscription. This process involves retrieval of relevant information data from a customer and vehicle database 22. The retrieved information data is routed by a central service center manager 11 to the respective local CSC operator 11a which has initially been selected as the most suitable for responding to the service request message from the customer, and which simultaneously is linked via a separate speech link to the customer, either by means of a cellular or a satellite communication network.

Thus, the CSCS 10 supplies the selected local CSC 11a with all customer and vehicle information needed for responding to the service request message. For example, this information may include customer address, vehicle registration number, vehicle type and specifications, a diagnostic report like engine status and brake status or malfunction, as well as the GPS position data of the vehicle. This information may be used by the CSC for adapting its response to the service request message, so that vehicle maintenance and repair may be performed with accuracy. The customer and vehicle database 22 may receive new vehicle data from a vehicle dealer 23 and new customer subscription data from a customer 24, for example via a World Wide Web server 25.

Each customer service center 11 may represent a national service center operator which is provided with a database that may include relevant national level data, e.g. maps, local roadside traveler service, traffic jam information, ferry operator information and similar information that is vital to a traveler.

Billing information to the customer may be sent from the CSC 11 via the functionality application server 21 and the customer and vehicle database 22 to a billing server 26.

The above described system offers the possibility for the functionality application server 21 to retrieve information from, or send command to any module in the vehicle 13 connected to the internal vehicle data bus or network. These reports and information can be stored by the customer and vehicle database 22 and be used for vehicle maintenance and repair.

The above-described system may be automatically activated by means of at least one sensor, which for example detects an air-bag deployment. Also, the service subscription can be activated by an alarm in case of theft.

A conflict concerning simultaneous execution of several such services is handled automatically by the functionality application server 21 by assigning and affecting a priority to each service type. Preferably, an air-bag deployment notification has the highest priority. If for example a driver asks for roadside assistance, the roadside assistance service of the system is activated. If subsequently the driver or a sensor signals an emergency, the roadside assistance is deactivated and the emergency assistance service is activated. If then an accident occurs, the emergency assistance service is deactivated and an air-bag deployment notification is activated.

The driver of a vehicle 13 can request service in any case. If he or she is lost, vehicle position is reported using GPS controller, and navigational information is provided by voice or data communication. If the vehicle has broken down, remote vehicle diagnostics may be performed, vehicle position is reported using GPS and breakdown mechanic and roadside assistance is informed. These are only a few examples of possible assistance the above-described system may offer.

The inventive system manages cellular communication and satellite communication as a backup when no cellular network is currently available. The inventive system is modular and can be customized according to the needs.

Possible applications concern any critical object in remote areas and which is accessible with difficulties. The object may for example be a water pump in a desert, an electricity generator in the mountains or a navigation beacon on an island. The object can send an equipment diagnostic report periodically and offers the possibility for a remote user to retrieve information from, or send commands to, any module of the equipment connected to the internal data bus or network. These reports and information can be stored by the functionality application server and be used for the equipment maintenance and repair. In case of a major problem detected by a sensor, the actual problem and equipment status can be reported. Data messages between the vehicle 13 and the CSCS 10, as well as between the CSCS 10 and the CSC 11, preferably has a standard format, like, for example, Global Automotive Protocol for Telematics Standard (GATS). The data message must contain at least one service identifier (code) for selecting the requested service.

The modular architecture of the inventive system makes it applicable to both mobile vehicles and static equipment and even small airplanes.

The invention is not limited to the above-described embodiments, but several modifications are possible within the scope of the patent claims.

The invention claimed is:

1. A system for providing a communication link between a central station (11) that is selected out of a number of individual, different central stations (11) and a remote mobile or stationary object (13) by means of transmitting and receiving communication means (14, 15) for speech and data transmission, the communication link comprises a speech transmission link between the selected central station (11) and the operator of the remote object (13), and a data transmission link between the remote object and the selected central station, wherein the system comprises a centralized communication and database server (10), the data transmission link being routed via said centralized communication and database server (10) for handling at least one of operator and object related information by the selected central station (11), wherein the information includes an emergency at the remote mobile or stationary object, the emergency having a priority of execution relative to a plurality of types of simultaneously required services used to determine preferred handling thereof.

2. The system as recited in claim 1, wherein the communication and database server (10) comprises a communication server (19) with functionality for handling operator and object identification, and operator and object information database (22) as well an application server (21) with functionality for making relevant information available to the central station (11).

3. The system as recited in claim 2, wherein the application server (21) is provided with functionality for updating operator and object information.

4. The system as recited in claim 1, wherein the communication link is established via a cellular communication network (14) or a satellite communication network (15).

5. The system as recited in claim 4, wherein the central station (11) is a customer service center and the remote object (13) is one of a vehicle, a boat, a plane and a remote facility.

6. The system as recited in claim 4, wherein the central station (11) is a customer service center and the remote object (13) is one of a vehicle, a boat, and a plane equipped with a Global Positioning System (16) for providing information regarding the remote object's position.

7. The system as recited in claim 1, wherein the different central stations have different interfaces, and the centralized communication and database server is adapted to handle at least one of operator and object related information in view of the interface of the selected central station (11).

8. The system as recited in claim 1, wherein each central station is a national service center operator.

9. The system as recited in claim 1, wherein the speech transmission link is separate from the data transmission link.

10. The system as recited in claim 1, wherein the speech transmission link is provided directly between the selected central station (11) and the operator of the remote object (13).

11. The system as recited in claim 1, including remote diagnosis of the emergency.

12. The system as recited in claim 11, further including generation of a diagnostic report.

13. The system as recited in claim 1, wherein a module provides the information using an emergency sensor.

14. The system as recited in claim 1, wherein the priority of execution is assigned and affected by a functionality application server.

15. A method for providing a communication link between a central station (11) being selected out of a number of individual, different central stations (11) and a remote mobile or stationary object (13), characterized in the steps of establishing a speech connection between the selected central station (11) and the remote object (13), and simultaneously establishing data connections between the remote object and a communication and database server (10) for handling at least one of operator and object related information by the selected central station as well as between the selected central station and said communication and database server (10) wherein the information includes an emergency at the remote mobile or stationary object, the emergency having a priority of execution relative to a plurality of types of simultaneously required services used to determine preferred handling thereof.

16. The method as recited in claim 15, further comprising the steps of locating the position of the remote object (13), controlling the functional and operational status of the remote object and its operator, and adapting the response to the type of service requested.

17. The method as recited in claim 15, further comprising the steps of providing the communication and database server (10) with the functionality for adding, removing and updating services.

18. The method as recited in claim 15, wherein the different central stations have different interfaces, and the centralized communication and database server is adapted to handle at least one of operator and object related information in view of the interface of the selected central station (11).

19. The method as recited in claim 15, wherein the speech transmission link is separate from the data transmission link.

20. The method as recited in claim 15, wherein the speech transmission link is established directly between the selected central station and the operator of the remote object.

21. The method as recited in claim 15, including remote diagnosis of the emergency.

22. The method as recited in claim 21, further including generation of a diagnostic report.

23. The method as recited in claim 15, wherein a module provides the information using an emergency sensor.

24. A method for activating a service center response to a vehicle service request call, said method comprising: providing a system for establishing a communication link between a central station being selected out of a number of individual, different central stations and a remote mobile or stationary object; and transmitting and receiving speech and data communications transmission via the communication link that comprises a speech transmission link between the selected central station and the operator of the remote object, and a data transmission link between the remote object and the selected central station which is routed via a centralized communication and database server for handling at least one of operator and object related information by the selected central station (11) wherein the information includes an emergency at the remote mobile or stationary object, the emergency having a priority of execution relative to a plurality of types of simultaneously required services used to determine preferred handling thereof.

25. The method as recited in claim 24, wherein the communication and database server comprises a communication server with functionality for handling operator and object identification, an operator and object information database as well an application server with functionality for making relevant information available to the central station.

26. The method as recited in claim 25, wherein the application server is provided with functionality for updating operator and object information.

27. The method as recited in claim 26, wherein the central station is a customer service center and the remote object is one of a vehicle, a boat, a plane and a remote facility.

28. The method as recited in claim 27, wherein the central station is a customer service center and the remote object is one of a land vehicle, a boat, and a plane equipped with a Global Positioning System for providing location information about the remote object.

29. The method as recited in claim 27, wherein the central station is a customer service center and the remote object is one of a land vehicle, a boat, and a plane equipped with a Global Positioning System for providing location information about the remote object.

30. The method as recited in claim 24, wherein the different central stations have different interfaces, and the centralized communication and database server s adapted to handle at least one of operator and object related information in view of the interface of the selected central station.

31. The method as recited in claim 24, wherein the speech transmission link is separate from the data transmission link.

32. The method as described in claim 24, wherein the speech transmission link is established directly between the selected central station and the operator of the remote object.

33. The method as recited in claim 24, including remote diagnosis of the emergency.

34. The method as recited in claim 33, further including generation of a diagnostic report.

35. The method as recited in claim 24, wherein a module provides the information using an emergency sensor.

* * * * *